(12) United States Patent
Merryweather et al.

(10) Patent No.: US 11,654,772 B2
(45) Date of Patent: May 23, 2023

(54) CHARGING PORT HEATER

(71) Applicant: ILLINOIS TOOL WORKS INC., Glenview, IL (US)

(72) Inventors: Paul Merryweather, Mokena, IL (US); Christopher Thomas Schaafsma, Wheaton, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 741 days.

(21) Appl. No.: 16/486,557

(22) PCT Filed: Feb. 27, 2018

(86) PCT No.: PCT/US2018/019968
§ 371 (c)(1),
(2) Date: Aug. 16, 2019

(87) PCT Pub. No.: WO2018/160571
PCT Pub. Date: Sep. 7, 2018

(65) Prior Publication Data
US 2020/0001721 A1 Jan. 2, 2020

Related U.S. Application Data

(60) Provisional application No. 62/465,350, filed on Mar. 1, 2017.

(51) Int. Cl.
*H02J 7/00* (2006.01)
*B60L 1/04* (2006.01)
(Continued)

(52) U.S. Cl.
CPC ............. *B60L 1/04* (2013.01); *B60J 10/86* (2016.02); *B60L 53/00* (2019.02); *B60L 53/18* (2019.02);
(Continued)

(58) Field of Classification Search
CPC .. B60L 53/00; B60L 53/18; B60L 1/04; B60L 2240/36; B60L 5/02; B60J 10/86;
(Continued)

(56) References Cited

U.S. PATENT DOCUMENTS 9,321,364 B1\* 4/2016 Ashworth ............... H05B 3/28
2011/0199047 A1\* 8/2011 Fujii ....................... B60L 53/16
320/109
(Continued)

FOREIGN PATENT DOCUMENTS

CN 101913353 A 12/2010
CN 101934769 A 1/2011
(Continued)

OTHER PUBLICATIONS

International Search Report for PCT/US2018/019968, dated Jun. 14, 2018.

*Primary Examiner* — Zixuan Zhou
(74) *Attorney, Agent, or Firm* — Quarles & Brady LLP

(57) ABSTRACT

An assembly includes a movable door assembly and a heating element. The movable door assembly is configured to be disposed on an exterior of a vehicle. The heating element is coupled to the movable door assembly, and is configured to receive energy from a battery disposed on the vehicle and to heat at least a portion of the movable door assembly.

20 Claims, 5 Drawing Sheets

(51) Int. Cl.
  *B60J 10/86* (2016.01)
  *B60L 53/18* (2019.01)
  *B60R 16/033* (2006.01)
  *H05B 1/02* (2006.01)
  *B60L 53/00* (2019.01)
  *B60K 6/28* (2007.10)
  *H05B 3/28* (2006.01)
  *B60L 5/02* (2006.01)

(52) U.S. Cl.
  CPC .......... *B60R 16/033* (2013.01); *H02J 7/0045* (2013.01); *H05B 1/0236* (2013.01); *B60K 6/28* (2013.01); *B60L 5/02* (2013.01); *B60L 2240/36* (2013.01); *B60Y 2200/91* (2013.01); *B60Y 2200/92* (2013.01); *B60Y 2300/91* (2013.01); *H05B 3/28* (2013.01); *H05B 2203/013* (2013.01); *H05B 2203/014* (2013.01); *H05B 2214/02* (2013.01)

(58) Field of Classification Search
  CPC .............. B60R 16/033; B60Y 2200/91; B60Y 2200/92; B60Y 2300/91; H05B 1/0236; H05B 3/28; H05B 2203/013; H05B 2203/014; H05B 2214/02
  USPC ............................................. 320/109; 701/22
  See application file for complete search history.

(56) References Cited

U.S. PATENT DOCUMENTS

2013/0068749 A1    3/2013   Thompson
2014/0138369 A1*   5/2014   Thompson ........... H05B 1/0236
                                                          219/203
2017/0324189 A1*  11/2017   Baughman ......... H01R 13/5202

FOREIGN PATENT DOCUMENTS

| | | |
|---|---|---|
| CN | 104348021 A | 2/2015 |
| CN | 104375634 A | 2/2015 |
| CN | 105835709 A | 8/2016 |
| CN | 205752812 U | 11/2016 |
| CN | 106458051 A | 2/2017 |
| JP | H0963688 A | 3/1997 |
| JP | 2014231249 A | 12/2014 |
| WO | 2016/130263 A1 | 8/2016 |

\* cited by examiner

CHARGING PORT HEATER

RELATED APPLICATIONS

This application represents the United States National Stage of International Application No. PCT/US2018/019968, filed Feb. 27, 2018, which claims priority to U.S. Provisional Patent Application No. 62/465,350, entitled "Charging Port Heater for Charge Port/Fuel Fill Housings," filed Mar. 1, 2017, which are hereby incorporated by reference in their entirety.

FIELD OF EMBODIMENTS OF THE DISCLOSURE

Embodiments of the present disclosure generally relate to heating systems for movable door assemblies of vehicles.

BACKGROUND

Electric vehicles have a contained battery source holding electrical energy used for primary motive power. Battery electric vehicles (BEV) rely exclusively on battery power while plug-in hybrid electrical vehicles (PHEV) employ a hybrid configuration using an internal combustion engine/generator combination and batteries, yet also allow charging of the batteries from an external source. Each of these vehicle types, accordingly, provides a charging port allowing the connection of an external electrical source to the contained batteries.

The charging port may be covered by a hinged door similar to that which would typically cover a gas cap in a conventional internal combustion automobile. The hinged door may be gasketed to prevent the ingress of water or moisture into the vicinity of the electrical connector of the charging point, such moisture as may promote corrosion or electrical shorting of the electrical contacts of the electrical connector. Exposure to the elements may present issues with conventional door assemblies. For example, ice may enter and/or form at or near a charging port while the door is open and the port is used for charging. Such formation of ice may make removal of a charging device more difficult, and/or may inhibit proper closing and sealing of the door after charging is complete. As another example, ice may form while the door is closed, thereby inhibiting opening of the door.

SUMMARY OF EMBODIMENTS OF THE DISCLOSURE

A need exists for convenient, reliable, and effective heating of energy ports and related locations on vehicles.

With those needs in mind, certain embodiments of the present disclosure provide an assembly that includes a movable door assembly and a heating element. The movable door assembly is configured to be disposed on an exterior of a vehicle. The heating element is coupled to the movable door assembly, and is configured to receive energy from a battery disposed on the vehicle and to heat at least a portion of the movable door assembly.

In at least one embodiment, a heated energy port assembly is provided that includes a housing, a movable door assembly, a seal, and a heating element. The housing is configured to be disposed along an exterior of a vehicle. The housing defines a cavity configured to accept an external power source for insertion into a port disposed within the cavity. The movable door assembly includes a movable door coupled to the housing. The seal is interposed between the movable door and the housing. The heating element is coupled to at least one of the housing, the movable door, or the seal, and is configured to receive energy from a battery disposed in the vehicle and to heat at least a portion of the at least one of the housing, the movable door, or the seal.

In at least one embodiment, a method (e.g., a method of providing a heated energy port assembly) is provided that includes providing a housing that is configured to be disposed along an exterior of a vehicle. The housing defines a cavity configured to accept an external power source for insertion into a port disposed within the cavity. The method also includes coupling a movable door assembly to the housing, with the movable door assembly including a movable door. Also, the method includes disposing a seal between the movable door and the housing. Further, the method includes providing a heating element coupled to at least one of the housing, the movable door, or the seal. The heating element is configured to receive energy from a battery disposed in the vehicle and to heat at least a portion of the at least one of the housing, the movable door, or the seal.

Figure 1:
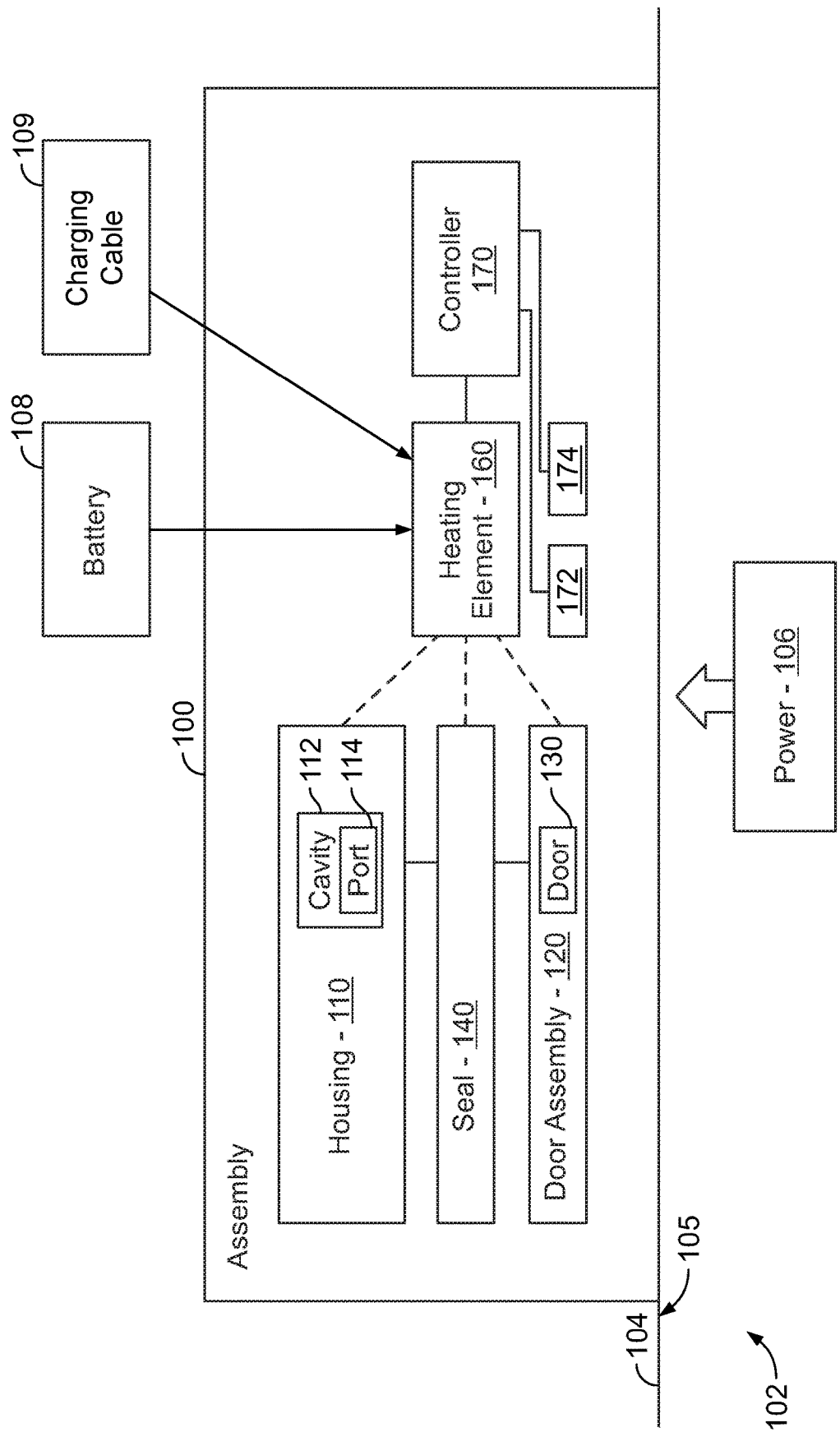
FIG. 1 illustrates a schematic block diagram of a heated energy port assembly, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a heated energy port assembly that provides heat to a housing, door, and/or seal associated with an energy port of a vehicle. The provision of heat to the housing, door, and/or seal helps prevent the formation of ice and/or address other issues present by exposure to weather or other environmental factors.

FIG. 1 provides a schematic block diagram of a heated energy port assembly 100, according to an embodiment of the present disclosure. As seen in FIG. 1, the heated energy port assembly 100 includes a housing 110, a movable door assembly 120 (which includes a door 130 in the example embodiment depicted in FIG. 1), a seal 140, and a heating element 160. It may be noted that various portions may be omitted or added in other embodiments. For example, in one example embodiment, the heated energy port assembly 100 may include the movable door assembly 120 and heating element 160 but omit one or more other portions depicted in FIG. 1. As another example, various embodiments may include a controller 170 and one or more associated sensors as discussed below.

The depicted housing 110 is configured to be disposed along an exterior 104 of a vehicle 102. In the illustrated example, the depicted housing 110 is shown as being recessed into the vehicle 102 and positioned flush with an exterior surface 105. However, it may be noted that in other embodiments the housing 110 may be recessed beneath the exterior surface 105, for example, or, as another example, the housing 110 may extend or protrude from the exterior surface 105.

As seen in FIG. 1, the depicted housing 110 defines a cavity 112 therein. In the illustrated embodiment, the cavity 112 is bounded on three sides by the housing 110 and on a fourth side by the exterior 104 of the vehicle 102. A movable door, which may be part of the movable door assembly 120, may form a portion of or be disposed along the exterior 104 proximate the cavity 112, such that moving the door from a closed to an open position exposes the cavity 112 to the surrounding atmosphere and provides access to the cavity 112. The cavity 112 in the illustrated embodiment is configured to accept an external power source 106. The external power source 106 is configured for insertion into a port 114 disposed within the cavity 112. Accordingly, an energy source (e.g., fuel, electrical energy) may be provided to the vehicle from the external power source 106 via the port 114. For example, the external power source 106 may be a fuel nozzle, with the port 114 providing access to a fuel tank of the vehicle 102. As another example, the external power source 106 may be an electrical plug for providing electrical energy from an external source to the vehicle 102, with the port 114 placing the plug of the external power source 106 into electrical communication with a battery disposed within the vehicle 102 so that the battery may be charged from the external power source 106 via the port 114.

The depicted movable door assembly 120 is configured to be disposed on the exterior 104 of the vehicle. For example, all or a portion of the movable door assembly 120 may be disposed flush with the exterior surface 105 and/or extend from or protrude from the exterior surface 105. Generally, the movable door assembly 120 in various embodiments includes one or more moveable pieces or portions configured to provide access to an interior of the vehicle 102. For example, the movable door assembly 120 may provide access to the cavity 112 (and/or one or more ports within the cavity). As another example, the movable door assembly 120 may provide access to a storage area (e.g., trunk). As additional examples, the movable door assembly 120 may provide access to an engine compartment or a seating area of the vehicle 102. For example, in some embodiments the movable door assembly may include a door or hatch that may be moved between on open position (providing access to an interior of the vehicle 102). Alternatively or additionally, the movable door assembly 120 may include a handle or latch or other device used in connection with moving a door or hatch.

In the depicted embodiment, the movable door assembly 120 includes movable door 130. The movable door 130 is configured to provide access to the cavity 112. For example, the movable door 130 in various embodiments is coupled to the housing 110 via a hinge or is otherwise movable with respect to the housing 110 and/or the exterior 104 of the vehicle 102. The movable door 130 may be moved to an open position to allow access to the port 114, and moved to a closed position to provide a barrier between the cavity 112 and the surrounding environment, for example to shield the port 114 from the elements when the port 114 is not being used to receive the external energy source 106. The depicted seal 140 is interposed between the movable door 130 and the housing 110, and is configured to provide a barrier between the cavity 112 and the external environment when the movable door 130 is in the closed position.

Figure 2:
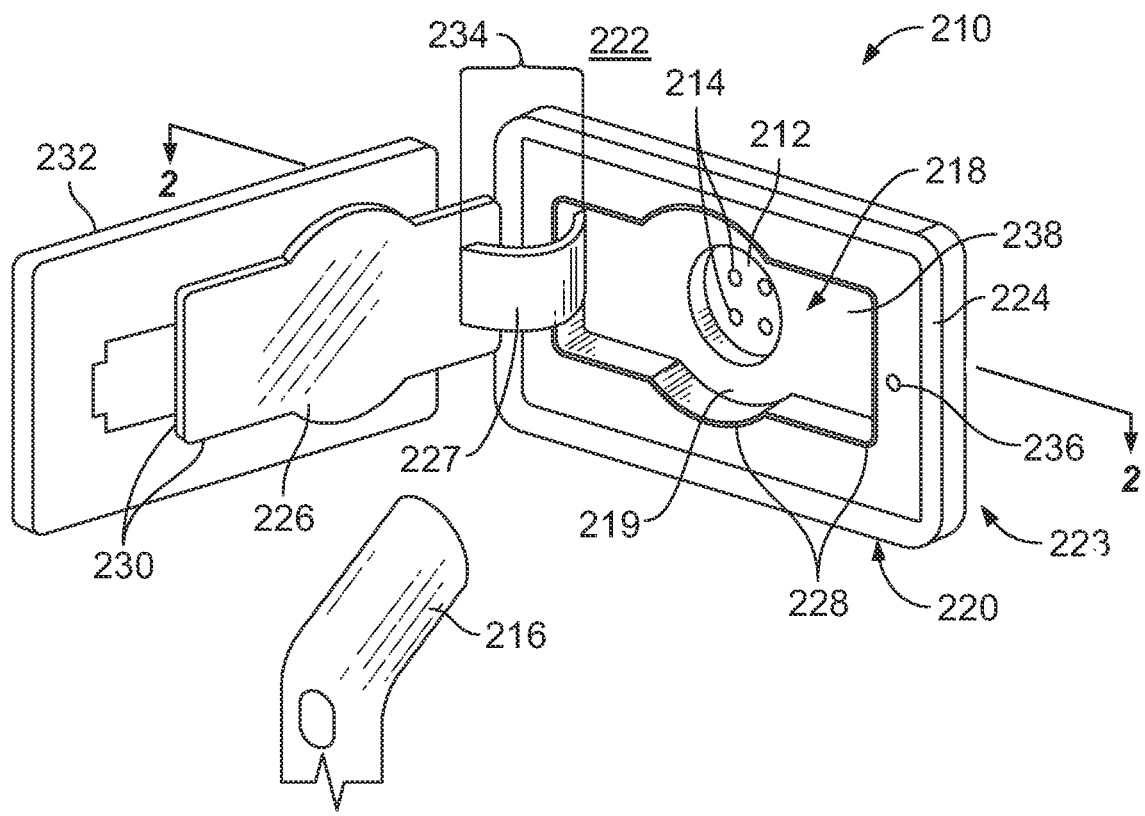
FIG. 2 illustrates a perspective view of an example energy port assembly, according to an embodiment of the present disclosure.

FIG. 2 illustrates a perspective view of an example energy port assembly 200 in accordance with various embodiments. The depicted energy port assembly 200 is configured for use with a battery-powered electric vehicle 210. As seen in FIG. 2, the battery-powered electric vehicle 210 includes a charging port 212 for receiving electricity for charging of a battery pack (not shown in FIG. 2) contained within the battery-powered electric vehicle 210 and used for primary motive power. The depicted charging port 212 includes one or more electrically conductive sockets 214 for releasably receiving corresponding mating conductive elements of a charging plug 216 connected to a source of electrical power (e.g., electrical power provided by an electrical grid). It may be noted that in other embodiments, alternatively or additionally, a port may be provided for accepting a nozzle or other device for delivering gasoline or other fuel.

In the illustrated example, the charging port 212 is recessed within a pocket 218 (or cavity, e.g., cavity 112) formed in a housing 220 that fits against a side panel 222 of the battery-powered electric vehicle 210. The depicted housing 220 includes an outwardly extending flanged portion 224 that abuts an outer surface 223 of the side panel 222 proximate an opening in the side panel 222 in which the housing 220 is disposed. In various embodiments, the housing 220 may be injection molded from thermoplastic material that is electrically nonconductive and resistant to corrosion.

The depicted energy port assembly 200 also includes a door 226 that is attached by a gooseneck 227 to a hinge point within the housing 220 such that the door 226 may be moved from an open position (the door 226 is shown in the open position in FIG. 2) to a closed position. In a closed position, the door 226 covers the pocket 218, and is sealed at a peripheral region 228 around the pocket 218 by a corresponding peripheral gasket 230 on the door 226 when the door 226 is in the closed position. The depicted example also includes a decorative plate 232 that attaches to the outer surface of the door 226 to help the door 226 blend in with the side panel 222 of the vehicle 210 when the door 226 is closed.

When the door 226 is moved toward the closed position, the door 226 is biased by an internal over center spring 234 to the closed position to provide a spring biasing toward closure. Accordingly, sufficient flexure of the gasket 230 is ensured to provide sealing of the pocket 218 against moisture and dirt. It may be noted that in other embodiments, motion of the door may be achieved with an actuator or motor driving the door open and closed, rather than a manual operation with a biased spring as shown in the depicted embodiment.

In some embodiments, the closed position of the door 226 may be detected and/or signaled by activation of a door switch 236 of the type generally known in the art. Alternatively or additionally, a temperature sensor 238 may be positioned in or near the pocket 218, or in thermal communication with the environment of the pocket 218, for example to help determine the air temperature of the pocket 218. In some embodiments, a lower surface of the pocket 218 includes one or more drainage holes 219.

Returning to FIG. 1, the heating element 160 is coupled to at least one of the housing 110, movable door 130, or seal 140. Accordingly, the heating element 160 may be used to prevent freezing of one or more of the housing 110, movable door 130, or seal 140, and/or to prevent freezing of the cavity 112. In the illustrated embodiment, the heating element 160 is configured to receive energy from a battery 108 disposed in the vehicle 102, and to use the energy received to heat at least a portion of one or more of the housing 110, movable door 130, or seal 140. Alternatively or additionally, the heating element 160 in various embodiments is configured to receive energy via a charging cable 109. The charging cable 109 in various embodiments is coupled to an external energy source (e.g., electrical grid), allowing the heating element 160 to receive energy without taking energy from the battery 108. The charging cable 109 may be coupled to the heating element 160 via a charging plug (e.g., charging plug 216) disposed at an end of the charging cable 109 that is configured to be coupled to a charging port on the vehicle 102 (e.g., charging port 212). Accordingly, the heating element 160 may receive energy from the charging cable 109 when the charging cable 109 is used to charge the vehicle 102.

Figure 3:
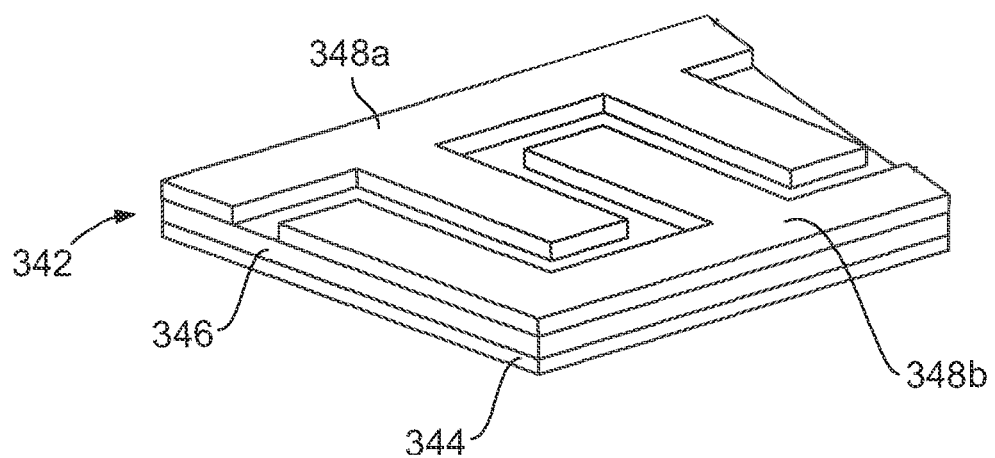
FIG. 3 illustrates a perspective view of a heating element, according to an embodiment of the present disclosure.

In some embodiments, the heating element comprises a positive thermal coefficient (PTC) material. For example, FIG. 3 depicts a heating element 344 that is made of PTC material 346. The PTC material 346 of the depicted embodiment conducts electricity with a positive temperature coefficient of resistance. The positive temperature coefficient of resistance causes the amount of electrical flow to vary according to the temperature of the material, with increased electrical flow at lower temperatures and decreased electrical flow at higher temperatures. The variation may be relatively abrupt, and/or may vary nonlinearly as a function of temperature. This property provides for a self-regulating temperature of the PTC material 346 when a substantially constant voltage source is applied across the electrodes 348*a*, 348*b*.

For the example embodiment depicted in FIG. 3, the heating element 342 is formed on a flexible polymer substrate 344 that is coated with the PTC material 346. In the illustrated embodiment, interdigitated electrodes 348*a* and 348*b* are place on top of the PTC material 346. The interdigitated electrodes 348*a* and 348*b* promote current flow through the PTC material 346 over the area of the coated substrate 344. In some embodiments, the various layers of the heating element 342 may be formed, for example, by screen-printing a conductive paint to form the PTC material 346 and the electrodes 348*a*, 348*b*. It may be noted that, in various embodiments, the order of the placement of the PTC material 346 and the electrodes 348*a*, 348*b* on the polymer substrate 344 may be reversed.

In various embodiments, a PTC material (e.g., PTC material 346) may be utilized that is constructed of an electrically conductive material having a relatively high resistance to provide low current draw and to generate heat over a surface of the PTC material. For example, the PTC material utilized in various embodiments may be a conductive polymer, for example, having a fine conductive particulate filler, and may be a conductive polyester material that exhibits a positive temperature coefficient. Further, associated electrodes (e.g., interdigitated electrodes 348*a*, 348*b*) may be comprised of a low resistance printed material (e.g., a silver ink comprising metallic silver particles in a binder, a metal foil, or the like). In various embodiments, the interdigitated electrodes 348*a*, 348*b* have much lower resistance than the PTC material 346 (which may be referred to as a resistive layer). For example, the resistance of the electrodes may be as low as practical. Electrical connection to the other components of the car may be obtained through the use of metallic rivets (not shown) that connect to the electrodes, for example, as shown in PCT patent application PCT/US 2016/013179 filed Jan. 13, 2016, and hereby incorporated by reference.

In various embodiments, the heating element 242 (or other heating element) may be applied to the housing 110 (or, as another example, the movable door 130) using adhesive. In other embodiments, the heating element may be applied using in-mold decorating technology which applies the PTC material and electrodes to a mold prior to plastic injection, or, as another example, by printing directly on the housing 110 (or movable door 130) without the use of a polymer substrate (e.g., polymer substrate 344).

In various embodiments, a heating element may be placed on a front or rear surface of the housing 110 (and/or movable door 130). For example, FIG. 4 depicts a side sectional view taken along line 2-2 of FIG. 2 of an embodiment where the assembly 100 includes a heating element disposed on a rear surface (e.g., oriented away from the surrounding atmosphere or toward the interior of a vehicle) of the housing 110, and FIG. 5 depicts a side sectional view taken along line 2-2 of FIG. 2 of an embodiment where the assembly 100 includes a heating element disposed on a front surface (e.g., oriented toward the surrounding atmosphere or away from the interior of a vehicle) of the housing 110.

Figure 4:
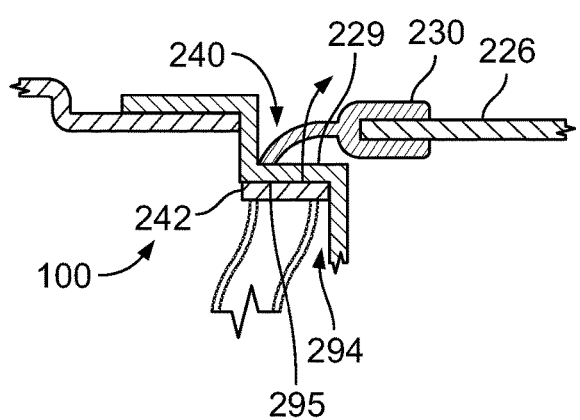
FIG. 4 depicts a side sectional view taken along line 2-2 of FIG. 2 of an embodiment where the assembly includes a heating element disposed on a rear surface of the housing, according to an embodiment of the present disclosure.

In the example embodiment depicted in FIG. 4, when the door 226 is in the closed position (as seen in FIG. 4), the peripheral gasket 230 seals against an interface surface 240 at a front surface 229 of a peripheral region 228 (see FIG. 2) of the housing 220. The resulting seal at the interface surface 240 provides an interface susceptible to adhesion from ice buildup or the like. In the embodiment depicted in FIG. 4, a heating element 242 is adhered or otherwise attached to a rear side 294 of the housing 220, for example a rear surface 295 of the housing 220 proximate the interface surface 240 to heat the interface surface 240 via thermal conduction through a plastic material of the housing 220, and accordingly reducing or preventing ice buildup and adhesion.

In the embodiment depicted in FIG. 4, where the heating element 242 is attached to the rear side 294 (e.g., rear surface 295) of the housing 220, the housing 220 may be composed of a material have a relatively high thermal conductivity, facilitating the conduction of heat through the housing 220 from the rear side 294 to the front side 295. The placement of a heating element on a rear surface of the housing 220 may be implemented in various different ways. For example, the entire housing may be molded out of thermally conductive material. As another example, the conductive material may be over molded afterwards onto a different (e.g., less conductive) housing material. As one more example, a conductive plastic piece may be inserted into a housing tool with the housing molded around the conductive plastic piece using a relatively low thermally conductive material. In various embodiments, placing the heating element on the rear side of the housing helps to protect the heating element from the elements or other potential sources of damage.

Figure 5:
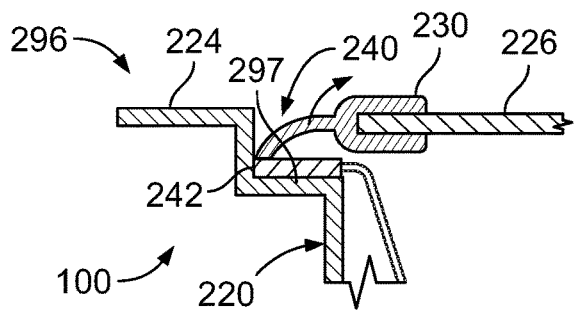
FIG. 5 depicts a side sectional view taken along line 2-2 of FIG. 2 of an embodiment where the assembly includes a heating element disposed on a front surface of the housing, according to an embodiment of the present disclosure.

In the embodiment depicted in FIG. 5, the heating element 242 is disposed on the front side 296 of the housing 220. For example, the heating element 242 may be adhered to or otherwise affixed to front surface 297. For embodiments such as the embodiment depicted in FIG. 5 having the heating element 242 disposed on the front side 296 of the housing 220, the housing material may be thermally insulating or having a relatively low thermal conductivity, in order to encourage localized heating of the interface surface 240 without the heat being drawn away too rapidly from the interface surface 240, for example, into the vehicle body.

Figure 6:
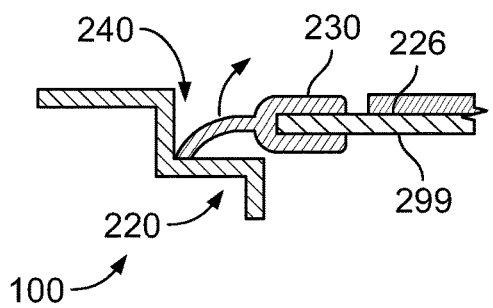
FIG. 6 depicts a side sectional view taken along line 2-2 of FIG. 2 of an embodiment where the assembly includes a heating element disposed on a rear surface of the door, according to an embodiment of the present disclosure.
Figure 6:
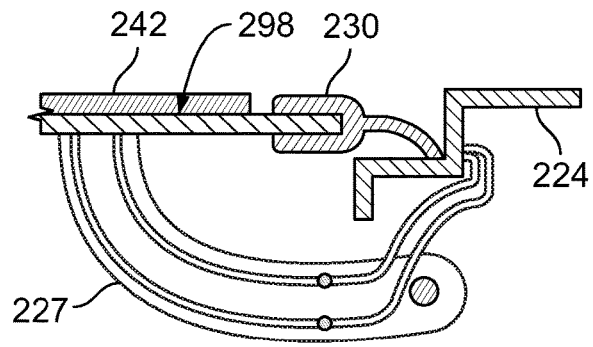

Additionally or alternatively to providing one or more heating elements in or on the housing, in some embodiments, one or more heating elements may be mounted on or to a moveable door. For example, FIG. 6 depicts a side sectional view taken along line 2-2 of FIG. 2 of an embodiment where the assembly 100 includes a heating element disposed on a front surface 298 (e.g., oriented toward the surrounding atmosphere or away from the interior of a vehicle) of the door 226. (It may be noted that in other embodiments a heating element may be disposed on a rear surface 299 (e.g., oriented away from the surrounding atmosphere or toward the interior of a vehicle) of the door 226.) In the example embodiment depicted in FIG. 6, the heater element 242 is placed along a front surface 298 of the door 226 inside of the gasket 230, providing a broad area heating of the door 226 that helps release the door 226 when the door becomes coated with ice from outside of the car, and/or helping prevent the accumulation of snow/ice when the door 226 is in the open position. In the illustrated embodiment, thermal conduction through the material of the door 226 to the gasket 230 (e.g., an overmolded gasket) heats the interface surface 240.

Figure 7:
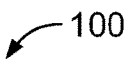
FIG. 7 depicts a side sectional view taken along line 2-2 of FIG. 2 of an embodiment where the assembly includes a heating element that is integrated in the housing, according to an embodiment of the present disclosure.

It may be noted that in various embodiments, at least one of the housing (e.g., housing 110) or movable door (e.g., movable door 130) includes an integrated PTC element. For example, FIG. 7 depicts a side sectional view taken along line 2-2 of FIG. 2 of an embodiment where the assembly 100 includes a heating element that is integrated (e.g., embedded) in the housing 220. As used herein, an integrated element may be understood as an element that is formed as a part of an overall structure, for example, fixed internally to the structure or on a surface of the structure. In various embodiments, an integrated element may be removed or separated from the structure into which it is integrated only by destructive means or by damaging the structure. For example, an integrated element may be molded into or as part of a structure (e.g., placed inside the structure or on a surface of the structure during a molding process or before curing. In the example embodiment depicted in FIG. 7, the heating element 242 is in-molded into the walls of the housing 220 at or near the interface surface 240. In some embodiments, the heating element 242 is a PTC element as discussed herein. In some embodiments, the heating element 242 includes a high resistance metal conductor such as a nichrome wire. The ends of the wire may loop back to a single termination point and be exposed by terminals (not shown in FIG. 7) that may be used to make an electrical connection to the remainder of the automotive electrical system (e.g., to a battery providing energy to the heating element 242).

Figure 8:
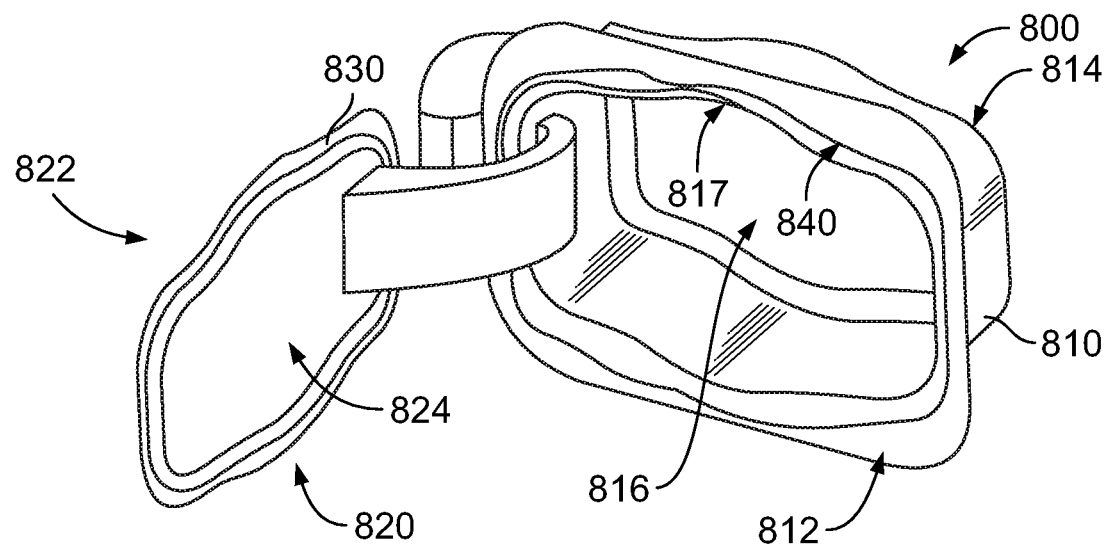
FIG. 8 illustrates a perspective view of a heated energy port assembly, according to an embodiment of the present disclosure.

FIG. 8 depicts a perspective view of a housing assembly 800. The housing assembly 800 includes a housing 810 and a movable door 820. In FIG. 8, the movable door 820 is shown in an open position. The housing 810 includes a housing front face 812 and a housing rear face 814. The movable door 820 includes a door front face 822 and a door rear face 824. The housing assembly 800 also includes an overmolded gasket 830 extending along the periphery of the movable door 820. It may be noted that the terms front and rear (similar to terms such as first and second) may be used relatively herein. In connection with the present discussion of FIG. 8, the housing front face and the door front face are referred to as being oriented toward the outside of the vehicle, and the housing rear face and the door rear face are referred to as being oriented toward the inside of the vehicle, such that the housing front face and door rear face are oriented toward each other, and contact each other when the door is in the closed position. (It may be noted that, alternatively, for example in connection with U.S. Provisional Patent Application No. 62/465,350, which is incorporated herein in its entirety, the door front face and the housing front face may be referred to as oriented toward each other, and the door rear face and the housing rear face may be referred to as oriented away from each other.)

In various embodiments, a heating element is disposed along at least one of the housing front face 812, housing rear face 814, door front face 822, or door rear face 824. For example, in the embodiment illustrated in FIG. 8, a heating element 840 is disposed along the housing front face 812. In the illustrated example, the heating element 840 extends along the housing front face 812, and is proximate to and surrounding the periphery 817 of a housing opening 816. The location of the heating element 840, for example, may correspond to the position of the overmolded gasket 830 when the door is in the closed position. In the illustrated embodiment, the heating element 840 is comprised of a PTC material. In other embodiments, the heating element 840 may include a resistive wire. Energy may be provided to the heating element 840 in various embodiment via leads 870 that extend through the housing 810 (e.g., via holes or other openings in the housing 810) to a power source. In the illustrated embodiment, the leads 870 extend toward the interior of a vehicle from the housing rear face 814.

Additionally or alternatively to a heating element on the housing front face 812, a heating element may be provided on the door rear face 824 (the surface of the door oriented toward the housing front face 812). For example, the heating element 840 may extend along or near the periphery of the door rear face 824 of movable door 820 proximate to the overmolded gasket 830. PTC elements may be incorporated into a housing surface (or other surface, such as door surface), for example, by applying the PTC material to a mold prior to an injection cycle, with plastic then injected into the mold to adhere to the PTC heating element. As another example, a PTC heating element may be printed onto a housing after the housing is molded. As one more example, an adhesive backed PTC heating element may be applied to a housing after the housing is molded. For embodiments where the heating element 840 is disposed on the housing, holes may be provided (e.g., molded) in the housing to provide access via leads to the heating element 840. For embodiments where the heating element 840 is disposed on the door, holes may be provided (e.g., molded) in the door and/or an associated hinge to provide access via leads.

In other embodiments, the heating element 840 may be disposed on the housing rear face 814 and/or the door front face 824. (See FIG. 6 for an example of a heating element disposed on a door front face.) For example, the heating element may be applied to the housing rear face 814 (and/or door front face 824) at a location generally corresponding to the location of the heating element 840 on the housing front face 812 depicted in FIG. 8. To provide heat to the interface between the housing 810 and the movable door 820, for embodiments where the heating element is placed on the housing rear face 814 and/or the door front face 824, the corresponding housing and/or door material in various embodiments is made of a material having a sufficiently high thermal conductivity for a desired level of heat transfer. In various embodiments, this may be achieved with an over-molding, co-injection, or two-show injection of a standard (e.g., relatively low thermal conductivity) material and a second more highly thermally conductive material (e.g., only in areas where heat conduction is desired).

It may be noted that in various embodiment, a heating element (e.g., heating element 840) may be composed of one or more resistive wire heating elements that is integrated into the housing 820 and/or movable door 830. For example, an insert molding process may be employed that positions heating wires inside a plastic material that forms the housing and/or door. While PTC heating elements may be effective self-regulating, for embodiments utilizing resistive wire heaters, a controller may be used to deliver current to the heating elements when desired, and to prevent current delivery when not required. To help conduct heat from a resistive wire heater to a desired location, in various embodiments, over-molding, co-injection, or two-show injection of a standard material and a second more highly thermally conductive material may be employed as discussed herein. In some embodiments, a resistive wire is integrated (e.g., embedded) in a housing (or door) by securing the resistive wire (e.g., rigid resistive wire) inside a mold with pins prior to an injection cycle. Plastic is then injected to form the housing (or door) around the wire, completely encapsulating the wire except for lead portions that protrude from the housing (or door).

With continued reference to FIG. 1, it may be noted that, in some embodiments, the heating element 160 may be placed in series with a line leading to the battery 108 so as to only be activated when the battery is being charged. Accordingly, continuous operation of the heating element 160 that may unnecessarily tax the battery 108 may be reduced or avoided.

In some embodiments, the assembly 100 includes a controller 170 configured to control provision of energy to the heating element 160. For example, the controller 170 may receive inputs from one or more sensors and control the provision of energy to the heating element 160 based on the received inputs. For example, the controller 170 may configured to provide heat to the housing 110, movable door 130, and/or seal 140 via the heating element 160 responsive to an input from a temperature sensor 172. For example, heat may be provided when the temperature at/or near the movable door 130 and/or seal 140 is below a threshold (e.g., a threshold temperature corresponding to ice formation). As another example, the controller 170 may configured to provide heat to the housing 110, movable door 130, and/or seal 140 via the heating element 160 responsive to an input from a charging sensor 174. In some embodiments, energy is provided to the heating element when the charging sensor 174 detects that the port 114 is being charged. Accordingly, heat is provided when the movable door 130 is in the open position with the cavity 112 exposed to the elements, while not running down the battery 108.

Figure 9:
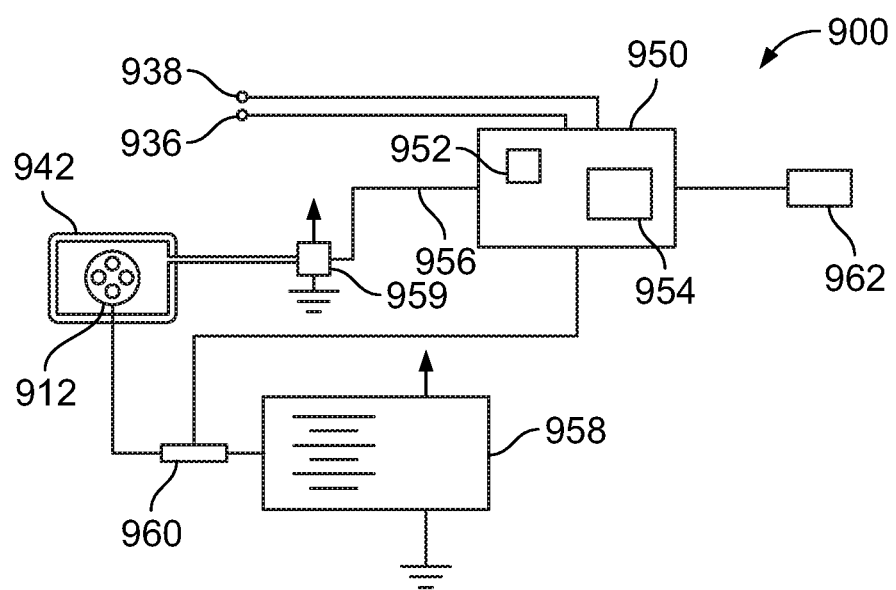
FIG. 9 provides a block diagram depicting an assembly 900 that includes a controller, according to an embodiment of the present disclosure.

FIG. 9 provides a block diagram depicting an assembly 900 that includes a controller. For the embodiment depicted in FIG. 9, the heating element 942 is controlled by an automotive controller 950. The depicted controller 950 has a processor 952 that executes a program in memory 954, and provides control signals on a control line 956 to a relay 959 for the application of power from an automotive battery pack 958 to the heater element 942. In the illustrated embodiment, the controller 950 monitors net inflow of current from the charging port 912 to the battery pack 958, for example, with a current sensor 960 to automatically activate the heater element 942 when a net charging occurs (at such times, it is known that there will be ample electrical power for heating to be provided). When charging is complete, power may be removed from the heater element 942 immediately, or, in some embodiments, after a predetermined period of time after the door is closed to help remove additional trapped moisture. Alternatively or additionally, the controller 950 may communicate with a dash switch 962 allowing the user to activate the heater, for example, in a pre-heat mode for a predetermined set period of time in anticipation of opening the door to provide access to the charging port 912. It may be noted that this function may be implemented via wireless data communication from a smart phone application or the like allowing the car to be remotely "warmed up". The controller 950 may monitor the door switch 936 so as to continue activation of the heater if the door is ajar, for example if the door is being held open by ice or the like in conjunction with monitoring of the temperature sensor 938 confirming the possibility of ice as a problem in sealing the door. The same door switch 936 may be used indicate to the user an ajar condition. The controller 950 may monitor the state of the battery and prevent activation of the heater element 942 if the battery power is below a predetermined level, or, as another example, if the temperature measured by the temperature sensor is above freezing.

Figure 10:
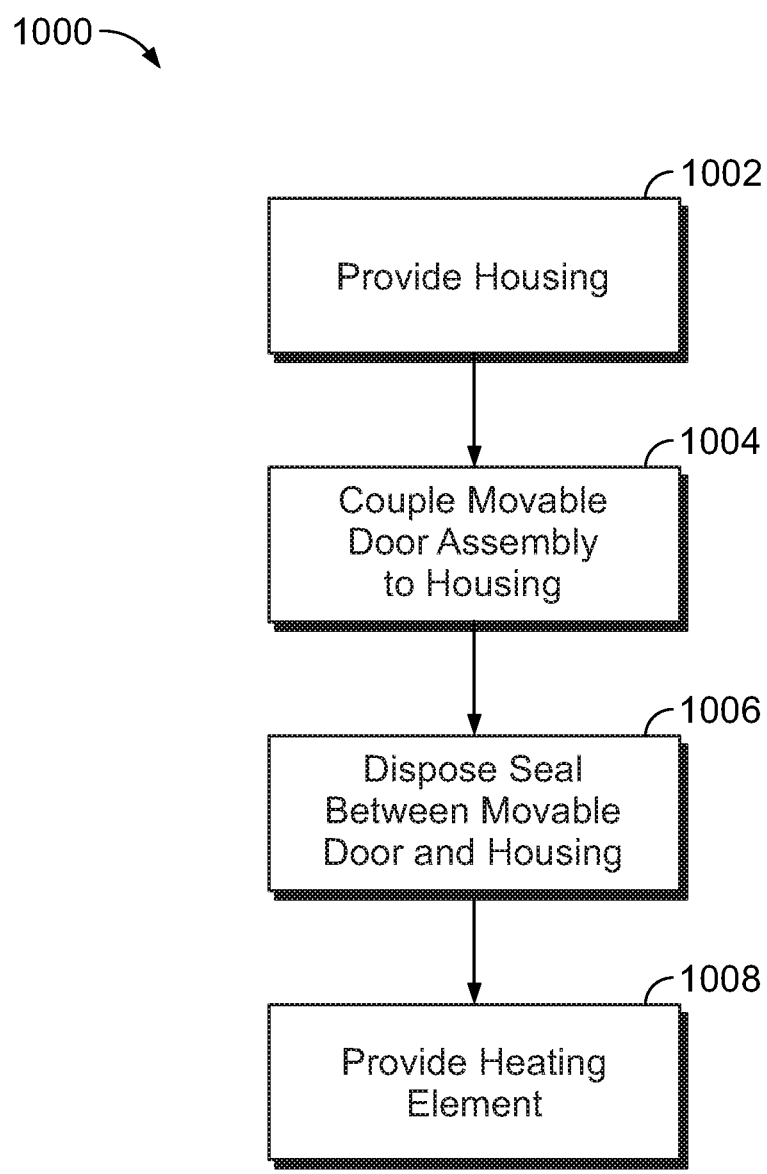
FIG. 10 provides a flow chart of a method, according to an embodiment of the present disclosure.

FIG. 10 provides a flowchart of a method 1000 for providing a heated energy port assembly in accordance with various embodiments. The method 1000 (or aspects thereof), for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion.

At 1002, a housing (e.g., housing 110, housing 220) is provided. Generally, the housing is configured to be disposed along an exterior of a vehicle. The housing defines a cavity that is configured to accept an external power source (e.g., electrical plug, fuel nozzle) for insertion into a port disposed with the cavity (e.g., disposed within the cavity when the housing is disposed along the exterior of the vehicle. The housing, as discussed herein, may be molded from one or more materials.

At 1004, a movable door assembly (e.g., movable door assembly 120) is coupled to the housing. The movable door assembly includes a movable door (e.g., movable door 130). Generally, the movable door assembly is coupled to the housing such that the movable door may be moved relative to the housing from an open position (providing access to the cavity of the housing) to a closed position (inhibiting or prevent access to the cavity). For example, the movable door assembly may include a hinge or gooseneck that movable couples the movable door to the housing.

At 1006, a seal (e.g., seal 140) is disposed between the movable door and the housing (e.g., at an interface between the movable door and the housing. In some embodiment, the seal is mounted around a periphery of the movable door and moves with the door. Generally, the seal is configured to fill in any gaps present between the door and housing when the door is in the closed position, and to prevent or inhibit incursion of moisture, dirt, or the like into the cavity when the movable door is in the closed position.

At 1008, a heating element (e.g., heating element 160) is provided. In various embodiments, one or more heating elements are coupled to at least one of the housing, the movable door, or the seal. In various embodiments, after the heated energy port assembly is installed on the vehicle, the heating element receives energy from a battery disposed in the vehicle and heats at least portion of the housing, movable door, and/or seal. In some embodiments, the heating element is made of a PTC material as discussed herein. In some embodiments, the heating element includes a resistive wire. It may be noted that all or a portion of step 1008 may be performed concurrently with other steps. For example, the heating element may be provided as a portion of the housing or movable door in various embodiments. In some embodiments, the heating element includes a resistive wire or a PTC element that is integrated into at least one of the housing or movable door. For example, the housing or door may be molded with the heating element inside and/or at a surface of the housing or door.

Embodiments of the present disclosure provide a heated energy port assembly that helps address potential issues regarding access to an energy port of a vehicle provided by weather or environmental factors. For example, embodiments of the present disclosure provide a heated energy port assembly that helps prevent the formation of ice on a door and/or housing.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

We claim:

1. An assembly comprising:
   a door assembly configured to be disposed on an exterior surface of a vehicle, wherein the door assembly is hingedly movable with respect to the exterior of the vehicle; and
   a heating element coupled to the door assembly, the heating element configured to receive energy from at least one of a battery disposed on the vehicle or a charging cable, and to heat at least a portion of the door assembly.

2. The assembly of claim 1, wherein the heating element comprises a positive thermal coefficient (PTC) material.

3. The assembly of claim 1, further comprising a controller and a temperature sensor, the controller configured to provide heat to the door assembly via the heating element responsive to an input from the temperature sensor.

4. The assembly of claim 1, further comprising a controller and a charging sensor, the controller configured to provide heat to the door assembly via the heating element responsive to an input from the charging sensor.

5. A heated energy port assembly comprising:
   a housing configured to be disposed along an exterior of a vehicle, the housing defining a cavity configured to accept an external power source for insertion into a port disposed within the cavity;
   a door assembly comprising a hingedly movable door coupled to the housing;
   a seal interposed between the hingedly movable door and the housing; and
   a heating element coupled to at least one of the housing, the hingedly movable door, or the seal, the heating element configured to heat at least a portion of the at least one of the housing, the hingedly movable door, or the seal.

6. The heated energy port assembly of claim 5, wherein the heating element comprises a positive thermal coefficient (PTC) material.

7. The heated energy port assembly of claim 5, further comprising a controller and a temperature sensor, the controller configured to provide heat to the at least one of the housing, the movable door, or the seal via the heating element responsive to an input from the temperature sensor.

8. The heated energy port assembly of claim 5, further comprising a controller and a charging sensor, the controller configured to provide heat to the at least one of the housing, the movable door, or the seal via the heating element responsive to an input from the charging sensor.

9. The heated energy port assembly of claim 5, wherein at least one of the housing or the movable door comprises an integrated PTC element.

10. The heated energy port assembly of claim 5, wherein the housing has a housing front face and the movable door has a door rear face, the housing front face and the door rear face opposing each other and oriented toward each other, wherein the heating element is disposed along at least one of the housing front face or the door rear face.

11. The heated energy port assembly of claim 5, wherein the housing has a housing rear face and the movable door has a door front face, the housing rear face and the door front face opposing each other and oriented away from each other, wherein the heating element is disposed along at least one of the housing rear face or the door front face.

12. The heated energy port assembly of claim 5, wherein the heating element includes a resistive wire element integrated into at least one of the housing or movable door.

13. The heated energy port assembly of claim 5, wherein the heating element is configured to receive energy from a battery disposed on the vehicle.

14. The heated energy port assembly of claim 5, wherein the heating element is configured to receive energy via a charging cable.

15. A method of providing a heated energy port assembly, the method comprising:

providing a housing configured to be disposed along an exterior of a vehicle, the housing defining a cavity configured to accept an external power source for insertion into a port disposed within the cavity;

coupling a door assembly comprising a hingedly movable door to the housing;

disposing a seal between the movable door and the housing; and providing a heating element coupled to at least one of the housing, the hingedly movable door, or the seal, the heating element configured to receive energy from a battery disposed in the vehicle and to heat at least a portion of the at least one of the housing, the hingedly movable door, or the seal.

16. The method of claim 15, wherein the heating element comprises a positive thermal coefficient (PTC) material.

17. The method of claim 15, further comprising integrating a PTC element into at least one of the housing or the movable door.

18. The method of claim 15, wherein the housing has a housing front face and the hingedly movable door has a door rear face, the housing front face and the door rear face opposing each other and oriented toward each other, wherein the heating element is disposed along at least one of the housing front face or the door rear face.

19. The method of claim 15, wherein the housing has a housing rear face and the hingedly movable door has a door front face, the housing rear face and the door front face opposing each other and oriented away from each other, wherein the heating element is disposed along at least one of the housing rear face or the door front face.

20. The method of claim 15, wherein the heating element includes a resistive wire element integrated into at least one of the housing or the hingedly movable door.

* * * * *